United States Patent [19]
Deans et al.

[11] 3,799,261
[45] Mar. 26, 1974

[54] TECHNIQUE FOR MEASURING FLUID DRIFT

[75] Inventors: Harry A. Deans; Robert L. Dalton, Jr., both of Houston, Tex.

[73] Assignee: Esso Production Research Company, Houston, Tex.

[22] Filed: Apr. 12, 1972

[21] Appl. No.: 243,358

[52] U.S. Cl............ 166/250, 23/230 EP, 166/305 R
[51] Int. Cl............................................. E21b 47/00
[58] Field of Search......... 23/230 EP; 166/264, 279, 166/300, 305, 250

[56] References Cited
UNITED STATES PATENTS

| | | | |
|---|---|---|---|
| 3,690,167 | 9/1972 | Chase et al. | 23/230 EP |
| 3,623,842 | 11/1971 | Deans | 23/230 EP |
| 2,553,900 | 5/1951 | Doan et al. | 166/264 |
| 2,868,625 | 1/1959 | Frank | 23/230 EP |

Primary Examiner—Henry C. Sutherland
Assistant Examiner—Jack E. Ebel
Attorney, Agent, or Firm—Lewis H. Eatherton

[57] ABSTRACT

Disclosed herein is a method for determining the presence and magnitude of fluid drift within a subterranean formation. A volume of a tracer chemical is injected into the formation by means of a well. The tracer is then displaced through the formation by injecting a volume of tracer-free fluid through the well. The volume of this displacing fluid is at least 25 percent of the total injected fluid. The well is then shut-in for a sufficient period of time for the tracer to move through the formation due to the influence of fluid drift, and the well is then returned to production. By measuring the time periods of production, injection, and shut-in and the corresponding production and injection volumes, the presence and magnitude of fluid drift within the formation can be determined. This method has particular applicability for use in conjunction with a tracer method for determining fluid saturations within the subterranean formation.

10 Claims, 4 Drawing Figures

TECHNIQUE FOR MEASURING FLUID DRIFT

BACKGROUND OF THE INVENTION

1. Field of the Invention

This invention relates to a process utilizing a well and includes the steps of testing or measuring formation fluids. More specifically, this invention relates to a method for determining the existence and magnitude of movement of a mobile fluid in a subterranean formation penetrated by a well.

2. Description of the Prior Art

The movement of fluids at underground locations, commonly called fluid drift, is important to a number of scientific disciplines. Hydrologists need information on the water movement in subsurface aquifers to intelligently plan water usage. Civil engineers need to know the extent and velocities of water movement for a variety of reasons. For example, this information can be useful in controlling leakage around dams and in estimating the origin and magnitude of subsurface sources which feed into water reservoirs. Petroleum engineers need to know the extent of water movement in subsurface hydrocarbon bearing formation; such information is important in conducting operations such as water flooding.

A number of methods have been suggested for determining the movement of fluids at subsurface locations. In water flooding operations to recover oil from subsurface formations, it is a common practice to inject a trace chemical into the formation at one location and monitor the produced fluids at surrounding wells to determine the presence of the injected tracer. From the information derived from this multi-well method, the direction of water movement in the reservoir and its average transit time between wells can be determined.

A single-well pulsing technique has been employed by hydrologists to determine the flow of water in subsurface aquifers. In this technique a volume of fluid containing a tracer, such as radioactive isotope, is introduced into the formation by means of a single well. The trace chemical moves into the formation and forms a cylindrical bank in contact with and surrounding the well. This cylinder of tracer is then permitted to move through the formation under the influence of ground water movement (fluid drift). After a suitable time period, fluid is withdrawn from the well by pumping and the produced fluids are analyzed for the presence and concentrations of the trace chemical. From the time of arrival of the trace chemicals in the produced fluids and the volume produced prior to such arrival, an estimation can be made of the presence and magnitude of fluid drift within the aquifer.

While both the multi-well and single-well techniques are useful in certain applications, they are subject to certain deficiencies. In the multi-well technique, the time for a trace chemical to move from one well to another can be excessive in certain instances. The single well pulse technique, of course, overcomes this problem but is subject to other deficiencies. The maximum tracer concentration in the produced fluids is generally not representative of the actual transit time of the trace chemical in the formation. This is due primarily to dispersion of the cylindrical trace chemical bank within the formation and to distortion of the trace chemical bank caused by the radial symmetry of pumping. Moreover, the wellbore itself represents an anomaly in the formation which causes distortion of the movement of water around the wellbore. This distortion can cause a part of the injected trace chemical to be retained at the well. When the well is placed on production, the retained trace chemical naturally distorts the concentration profile of the produced trace chemical. This concentration profile can be further distorted during pumping. The cylinder of trace chemical moves away from the well under the influence of a substantially uniform force (fluid drift). However, when the well is produced it approximates a point source of low pressure in the formation. Such a localized area of low pressure can cause the cylinder of trace chemical to become distorted, and as a consequence the results of such a method can be difficult to interpret.

SUMMARY OF THE INVENTION

The presence and magnitude of fluid drift within a reservoir is determined by injecting a trace chemical into the formation by means of a well. The trace chemical is then displaced away from the well by a fluid which is free of the trace chemical. The volume of this displacing bank is at least 25 percent of the total injected fluids including the trace chemical bank, and the fluids are injected at a rate which is sufficiently high so that the fluids will overcome the force of any anticipated fluid drift within the formation. Thus the trace chemical bank will be radially displaced into the formation and will surround the well in an annular bank.

Following this displacement, the well is shut-in for a sufficient period of time for the trace chemical to move within the formation if fluid drift is present. The well is then produced, and the produced fluids are monitored for the presence and concentration of the trace chemical. The presence and magnitude of fluid drift in the formation is then determined from the relationship between the injection, shut-in, and production periods and the related volumes of fluids injected or produced during these intervals.

As a result of the injection rate of the fluids and the displacement of the trace chemical bank into the formation and away from the well, the presence of the trace chemical in the produced fluids will be more clearly defined. This sharper definition of the trace chemical production will overcome many of the difficulties in determining the presence and magnitude of fluid drift within a formation.

As will be obvious to one of ordinary skill in the art, this invention has broad applicability. It can be used in many instances where knowledge of the movement of fluids in a subsurface formation is desired. For example, the technique can be employed by hydrologists to determine the movement of water in an aquifer. Similarly, the technique can be employed by reservoir engineers to determine the rate of advance of flood water in an oil recovery operation. However, the technique has primary applicability when used in conjunction with a tracer method for determining the fluid saturations of a subterranean reservoir.

DESCRIPTION OF THE INVENTION

The practice of this invention can perhaps be most clearly understood by referring to FIGS. 1-4 which illustrate one embodiment of the method.

Figure 1:
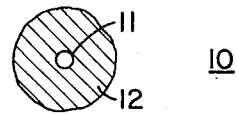
FIGS. 1–4 are schematic plan views of a subterranean formation during the practice of an embodiment of this invention.
Figure 2:
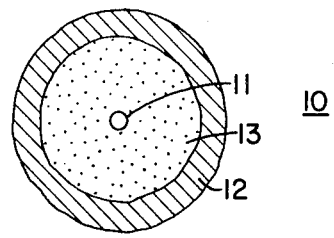

As is seen in FIG. 1, a subterranean formation 10 is penetrated by a well 11. A volume of the trace chemical fluid 12 is injected through the well 11 and into the formation. As shown in FIG. 2, the trace chemical is then displaced away from the well 11 by a volume of fluid 13 which is substantially free of the trace chemical. Injection of fluids is then terminated and the ring of trace chemical is permitted to move through the formation under the influence of fluid drift. It should be understood that the term "fluid drift" as used herein refers to the movement of fluid within the formation due to causes other than injection or withdrawal of fluids at the well.

Figure 3:
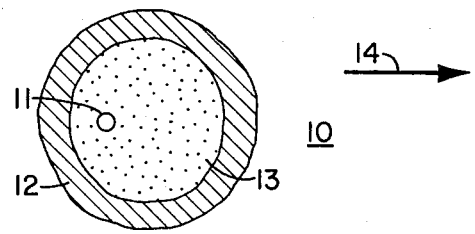

FIG. 3 shows the relative positions of the tracer bank, the displacing bank and the well at the end of the shut-in period. As can be seen the fluid banks have moved within the formation under the influence of fluid drift. (The direction of the fluid drift is indicated by the arrow 14.)

Figure 4:
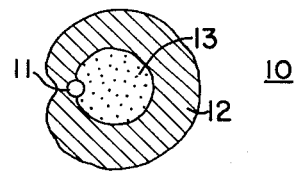

After sufficient time has elapsed for the tracer bank to move within the formation due to this fluid drift, the well is placed on production. As can be seen in FIG. 4 the movement of the injected fluids is now reversed and these fluids are withdrawn from the formation and produced by means of the well. During this production phase the produced fluids are sampled and analyzed by conventional techniques for the presence of the tracer chemical. As will later be discussed in greater detail, the presence and magnitude of the fluid drift in the formation can be determined from the length of the production, injection, and shut-in periods and the related injection and production volumes.

While this invention has broad applicability, it is particularly suitable for use in conjunction with the tracer method for determining fluid saturations in a subterranean formation (U.S. Pat. No. 3,623,842, "Method of Determining Fluid Saturations in Reservoirs," issued Nov. 30, 1971). This invention is particularly suitable for use in conjunction with this tracer method because the same substances or tracers which are used to determine the fluid saturation of the reservoir can also be used to determine the presence and magnitude of fluid drift.

For clarity, it may be helpful to briefly describe the tracer technique for determining fluid saturations. In this technique, the fluid saturations of a hydrocarbon bearing formation containing a mobile fluid and an immobile fluid are determined by injecting a carrier fluid containing a reactant into the formation.

One embodiment of the tracer technique for determining fluid saturations measures the amount of mobile oil present in a subterranean formation which contains a mobile water phase. This embodiment is generally accomplished in three stages. In the first stage, a carrier fluid (such as formation water) containing a reactant is injected by means of a well into the formation. A suitable reactant might be ethyl acetate which is capable of hydrolyzing with the formation to produce ethanol, acetic acid and unreacted ethyl acetate. The ethyl acetate solution is then displaced away from the well by the injection of further quantities of formation water which does not contain ethyl acetate. During the second stage, the well is shut-in to permit the ethyl acetate to partially hydrolyze. During the third stage, the well is placed on production and the produced fluids are monitored for the presence and concentrations of ethanol and ethyl acetate. Because the ethyl acetate is soluble in the oil and the ethanol is not, the ethanol bank returns to the well at a higher velocity. This difference in velocity between the ethanol and ethyl acetate is a chromatographic effect which results in a separation in the two chemicals as they move through the formation. The degree of separation between these chemicals is a function of the oil saturation of the formation. By detecting the presence of ethyl acetate and ethanol in the produced fluids and analyzing the results by chromatographic techniques, the relative proportions of oil and water in the formation can be determined.

While this tracer technique has proven to be highly effective in measuring fluid saturations in a formation, the results can at times be difficult to analyze. This analytical difficulty can be pronounced where there is a strong movement of water within the formation. This water movement, so called fluid drift, is commonly caused by the injection or withdrawal of reservoir fluids from nearby wells. This fluid drift distorts the concentration profiles of the ethanol and ethyl acetate and makes the analysis for fluid saturations more difficult. The method disclosed herein for determining the presence and magnitude of fluid drift within the reservoir can of course be used to overcome, at least in part, this analytical difficulty.

The analysis of the results of the method disclosed herein for determining the presence and magnitude of fluid drift in a formation will perhaps be more clearly understood by considering the following discussion of mathematical expressions which relate the fluid drift or drift velocity of the mobile water phase to the movement of a trace chemical within the formation. The general material balance equation of a trace chemical $i$ within a porous medium containing mobile and immobile fluid phases can be described by:

$$(1 + \beta_i)(\partial c_i/\partial t) + \underline{V} \cdot \nabla c_i + kc_i = \nabla \cdot (\underline{\underline{D}}_e \cdot \nabla c_i) \quad (1)$$

where
$c_i$ = concentration of trace chemical $i$
$\beta_i$ = retardation factor for trace chemical $i$ due to its solubility in the immobile fluid phase; $\beta_i = K_i S_o/1 - S_o$ where
$K_i$ = equilibrium distribution coefficient of trace chemical $i$ between the immobile phase and the mobile phase.
$S_o$ = fraction of pore space occupied by the immobile phase
$1 - S_o$ = fraction of pore space occupied by the mobile phase
$\underline{V}$ = local interstitial fluid velocity vector of the mobile phase
$\nabla$ = the gradient operator
$\nabla$ = the divergence operator
$k$ = the first order rate constant for the decomposition of trace chemical $i$
and
$\underline{\underline{D}}_e$ = the effective dispersion tensor for trace chemical $i$ in the mobile phase.

In the practice of this invention, the data obtained in the manner herein described can be interpreted by use of this general material balance equation to determine the drift velocity of the mobile fluid phase in a subterranean formation. In most cases, these mathematical operations would be performed using standard numerical procedures and would be solved using a digital computer. However to assist in the understanding of this invention, the general material balance equation will be reduced to a less complex mathematical expression by using some simplifying assumptions.

Where the test is properly controlled, dispersion of trace chemical i can be minimized and ignored in the calculation. It can also be assumed that the movement of the trace chemical is essentially horizontal with no substantial vertical component. Furthermore, the vector velocities in equation (1) can be converted to nondirectional velocities by considering the velocity of the trace chemical along a single streamline — the streamline which has a direction opposite to $V_{drift}$ (the velocity of fluid drift). This nondirectional analysis is possible since the tracer which is first detected in the well during production will travel along this $x$ streamline.

The component of trace chemical i which is first to arrive and be detected at the well during the production phase is, of course, the last component injected along the $x$ streamline. This component will occupy various positions along the $x$ streamline at various points in time. When this component enters the formation during injection, time ($t$) is equal to 0. This component is displaced along the $x$ streamline by tracer-free fluid until $t = t_1$ and the well is then shut-in until $t = t_2$. Beginning at $t_2$, fluid is withdrawn from the well at a rate of $Q_{prod}$ and at $t = t_3$ the component reappears at the well and is observed in the produced fluids. During the shut-in period between $t_1$ and $t_2$, the component which is at position $x_1$ on the $x$ streamline at $t_1$ will move to position $x_2$ at $t_2$ if $V_{drift} \neq 0$.

Then by integrating equation (1) and stating the positions along the $x$ streamline in terms of well and formation properties the following equations can be derived:

$$x_2/D - \ln[1 - x_2/D - C(t_2 - t_1)] = C \cdot t_2 \quad (2)$$

$$x_2/D - \alpha \ln(1 + x_2/\alpha D) = C(t_3 - t_2) \quad (3)$$

where
$D = Q_{inj}/2\pi (H\phi_w) V_{drift}$
$C = 2\pi H\phi_w V^2_{drift}/(1 + \beta_i) Q_{inj}$
$\alpha = Q_{prod}/Q_{inj}$
$Q_{inj}$ = The volume of fluid containing trace chemical i injected per unit of time at the injection well
$Q_{prod}$ = The volume of fluid produced at the injection well per unit of time between $t_2$ and $t_3$
$H$ = Thickness of porous medium
$x$ = Distance of trace chemical i from injection well along the $x$ streamline
$\phi_w$ = Fraction of the pore space of the porous medium occupied by the mobile fluid.
$V_{drift}$ = the velocity of fluid drift in the porous medium due to causes other than injection or production of fluids at the injection well.

Since $t_1$, $t_2$, $t_3$, and $\alpha$ can be measured from field observations, equations (2) and (3) can be solved simultaneously for $x_2/D$ and $C$.

Thus from the definition of C the quantity can be stated $$V_{drift}/\sqrt{1+\beta_i} = \sqrt{C \cdot Q_{inj}/2\pi H\phi_w} \quad (4)$$

and $V_{drift}/\sqrt{1+\beta_i}$ can be determined since $C$ is now known, $Q_{inj}$ is available from field measurements and $H\phi_w$ can be readily estimated.

If $\beta_i$ is known from other measurements, $V_{drift}$ can be directly determined from equation (4). Also $V_{drift}$ can be determined directly from equation (4) when the trace chemical has essentially no solubility in oil, e.g., methanol, since $\beta$ will be essentially 0 in such an instance. Furthermore, $V_{drift}$ can be determined from field measurements of two tracer chemicals having different values for $\beta$. In such an instance the two expressions $V_{drift}/\sqrt{1+\beta_1}$ and $V_{drift}/\sqrt{1+\beta_2}$ can be solved simultaneously for $V_{drift}$.

As will be noted from the foregoing, fluid drift is calculated from equation (4) using a specific part of the concentration-volume curve as a reference. In the illustration given, this part was the component which was last injected along the $x$ streamline and the first to be detected at the well during the production phase. It should be clear, however, that any other identifiable components of the tracer bank may be used as a reference. In that regard, it should be noted that it will generally be preferred to use the entire tracer concentration-volume curve when the results of the method are analyzed using the general material balance equation, equation (1). In such an instance, a vast number of tracer components are used as a reference and consequently the accuracy of the determination can be improved.

As was previously stated this invention has primary applicability when used in conjunction with the tracer method for determining fluid saturations in subterranean formation. However this invention has broader applicability and the determination of fluid drift under certain circumstances can be more simplified.

For example, where this method is used solely to determine the presence and magnitude of fluid drift it would be unnecessary to use a reactive tracer and therefore there would be no need for determination of the reaction rate constant. In addition, there would be no retardation factor to be determined where the method is used in a formation having a single fluid phase such as an aquifer. This would also be true where the tracer which is employed to determine the presence of fluid drift is substantially insoluble in any immobile phase present in the formation.

The trace chemicals suitable for use in the practice of this invention can be selected by one of ordinary skill in the art from a wide category of known and available substances. In making such a selection, the purpose of the trace chemical and the particular manner in which it is to be used should of course be borne in mind. The chemical should be soluble in the mobile formation fluid; the chemical should also be soluble in its carrier fluid in those operations where it is to be employed in a diluted form. The chemical should have little or no tendency to adsorb on or react with the matrix of the porous media. It should of course be capable of detection by such means as chemical analysis or radiological techniques where a radioactive chemical is employed. Although it is not a requisite, the chemical can be capable of reacting within the formation, as in the case of ethyl acetate where the trace chemical is used to determine the immobile oil saturation in a formation. In that regard, it should be understood that the term trace chemical as used herein refers to both the reactant and its reaction products. Preferably the trace chemical should be inexpensive and readily available.

The concentration of the trace chemical in the tracer bank and the volume of the tracer bank can be established by one of ordinary skill in the art using general engineering principles. The trace chemical can be used in an undiluted, substantially pure form. However, in most instances, as a matter of economics it will be preferred to use the trace chemical in concentrations of 1%–2% in a suitable carrier fluid such as formation brine. The concentration of the chemical generally will only need to be high enough so that the trace chemical may be detected and analyzed when fluids are produced from the formation. The volume of the trace chemical bank should be great enough that the trace chemical is not highly dispersed in the formation prior to its production. However, the volume should not be so great that the chemical cost becomes prohibitive or that the length of time for producing the chemical is excessive.

Where the trace chemical is dispersed in a carrier fluid, this carrier fluid should be miscible with the mobile fluid phase in the formation and immiscible with any immobile fluid phase present. In most instances the preferred carrier fluid would be mobile fluid which has been produced from the formation such as formation brine. The use of formation fluid as a carrier fluid will insure miscibility and compatibility with the formation. Formation fluids are also preferable for use as a displacing agent to move the trace chemical solution away from the well during the injection stage.

The length of the shut-in period may vary depending on the particular circumstances in the application of the method. At a minimum the shut-in period should be sufficiently long to permit the trace chemical to move within the formation due to fluid drift. However, the shut-in period should not be so long that the trace chemical drifts past the well prior to placing the well on production. In most instances, the expected magnitude of fluid drift in a formation may be known. In the absence of such information, a minimum value of fluid drift can be established. Such a minimum value would be established on the basis that a fluid drift of a lesser magnitude would be of no consequence. For example in the tracer technique for measuring residual fluid saturation, fluid drift of less than 0.2 feet per day would have little or no effect on the analysis of the results. Therefore, the shut-in period should be long enough so that fluid drift of this magnitude or greater can be detected.

The volume of the tracer-free displacing fluid should be large enough to completely displace the tracer bank away from the well and into the formation. As a minimum, the volume of this displacing fluid should be at least 25 percent by volume of the total injected fluid (tracer bank plus displacing bank). In many instances, the volume of the displacing bank will be even greater and will be in the range of from 50 to 75 percent by volume of the total injected fluids. These volumes of displacing fluid will insure that the tracer bank is removed from the vicinity of the well and will result in a more sharply defined tracer concentration profile during the production phase.

It should be understood that the term "tracer-free displacing fluid" does not mean that such fluid is devoid of all chemical substances. The term "tracer-free," as applied to a fluid herein, merely means that such a fluid can be distinguished from the tracer fluid by conventional analytical methods. In that regard, the "tracer-free" fluid may even contain amounts of the tracer chemical so long as the two fluid banks can be distinguished, for example by changes in concentration.

The tracer bank and the displacing fluid should be injected at a rate which is sufficiently high so that the tracer bank can move through the formation against the fluid drift. Quite naturally at lower rates the tracer bank on the upstream side of the well would stagnate or even move downstream due to the presence of fluid drift in the reservoir. Therefore the approximate magnitude of fluid drift should be estimated and the fluids should be injected at a rate which is high enough to move the tracer bank against this force for a desired distance from the well.

It should be understood that a plurality of tracer chemicals may be employed in the test. So long as each trace chemical can be identified the concentration-produced volume profiles of each of the trace chemicals can be correlated to more accurately determine the magnitude of fluid drift. In that regard it should be noted that the concentration profiles for ethyl acetate and ethanol can be correlated in this manner in the previously described method for determining residual oil saturations in a formation.

EXAMPLE

As an example of a field application of the method of this invention, approximately 300 barrels of formation water containing 2 percent ethyl acetate by volume are injected into a subterranean formation containing mobile water and immobile oil. The ethyl acetate-water solution is then displaced by additional quantities of formation water without ethyl acetate for 3.72 days at a rate of 1,200 cubic feet per day. The well is then shut-in for nine days after which the well is produced at a rate of 1,614 cubic feet per day. After 0.32 days of production, ethyl acetate is first detected in the produced fluids. From this information equations (2) and (3) can be solved simultaneously to determine values for $X_1/D$, $X_2/D$, and $C$. These values are $$X_1/D = 0.3414$$

$$X_2/D = 0.1569$$

$$C = 0.0205 \text{ days}^{-1}$$

From other data on this field it is known that the product $(H\phi_w) \approx 6$ feet and $\beta_i$ (for the ethyl acetate) is approximately equal to 0.5. Therefore equation (4) can be solved for $V_{drift}$ to give $$V_{drift} = \sqrt{(1+\beta_i)\, Q_{inj} C/2\pi\, (H\phi w)} = \sqrt{(1.5)(1200)(0.0205)/(6.28)(6)} = 0.99 \text{ ft/day}$$

The principle of the invention and the manner in which it is contemplated to apply that principle have been described. It is to be understood that the foregoing is illustrative only and that other means and techniques can be employed without departing from the true scope of the invention as defined in the following claims.

What is claimed is:

1. A method for determining the presence and magnitude of fluid drift within a subterranean formation containing at least one fluid and penetrated by a well which comprises injecting a volume of a tracer fluid into the formation by means of the well; then injecting a volume of a tracer-free displacing fluid into the formation by means of the well, the volume of the tracer-free displacing fluid being at least 25% of the total fluid injected; then shutting in the well for a sufficient period of time to permit the injected tracer fluid to move a detectable distance through the formation due to the influence of a fluid drift of at least 0.2 feet per day; then producing fluids from the formation by means of the well; analyzing the produced fluids for the presence of the tracer; measuring values for the time period of fluid injection, the time period of fluid production, the time interval between fluid injection and production, and the volumes of fluids injected and produced; and analyzing said values to determine the presence and magnitude of fluid drift within the formation.

2. A method as defined by claim 1 wherein the volume of tracer-free fluid is approximately equal to the volume of tracer fluid.

3. A method as defined by claim 1 wherein the volume of a tracer-free fluid is between one and one-half times the volume of the tracer fluid.

4. A method as defined by claim 1 wherein said tracer is capable of reacting within the formation to form at least one reaction product.

5. A method as defined by claim 4 wherein said formation contains a mobile fluid phase and an immobile fluid phase and wherein said tracer and said reaction product have differing partition coefficients with respect to said fluid phases.

6. A method as defined by claim 5 wherein said tracer and said reaction product are produced by means of the well and a chromatographic property related to said tracer and a chromatographic property related to said reaction product are measured to determine the relative amounts of fluid phases existing within the formation.

7. A method as defined by claim 1 wherein said tracer is a radioactive isotope.

8. A method as defined by claim 1 wherein said tracer fluid comprises an aqueous carrier fluid containing a tracer chemical.

9. A method as defined by claim 8 wherein the concentration of said tracer chemical in said carrier fluid is approximately 1 to 2 percent by volume.

10. A method as defined by claim 9 wherein said tracer chemical is ethyl acetate.

* * * * *